United States Patent [19]

Blet et al.

[11] Patent Number: 4,735,658

[45] Date of Patent: Apr. 5, 1988

[54] NOVEL WATER-INSENSITIVE MATERIALS INTENDED FOR PUBLIC WORKS; PROCESS AND CHEMICAL COMPOSITION FOR THEIR OBTENTION

[75] Inventors: Claude Blet, Rueil Malmaison; Didier Chabert, Saint Mande; Laurent Frouin, l'Hay les Roses; Jean-Louis Reymonet, Paris; Ngoc L. Tran, Yerres, all of France

[73] Assignees: Ceca S.A., Velizy; L'Etat Francais, Paris, both of France

[21] Appl. No.: 850,750

[22] Filed: Apr. 11, 1986

[30] Foreign Application Priority Data

Dec. 4, 1985 [FR] France ................... 85 05532

[51] Int. Cl.$^4$ ............................ C08L 1/08; C08K 5/17
[52] U.S. Cl. ..................................... 106/171; 106/186; 106/206; 106/211; 106/900; 404/76; 524/236
[58] Field of Search .............. 106/208, 171, 186, 206, 106/211, 900; 524/47–61, 236; 404/76

[56] References Cited

U.S. PATENT DOCUMENTS

| | | | |
|---|---|---|---|
| 2,160,119 | 5/1939 | Broderson | 106/308 N |
| 2,847,315 | 8/1958 | Turner | 106/123.1 |
| 3,772,893 | 11/1973 | Eilers | 106/900 |
| 4,097,437 | 6/1978 | Dhake | 524/236 |
| 4,139,588 | 2/1979 | Clem | 106/900 |
| 4,177,078 | 12/1979 | Welna et al. | 106/900 |
| 4,206,195 | 6/1980 | Bolich et al. | 424/16 |
| 4,414,130 | 11/1983 | Cheng | 252/174.13 |

*Primary Examiner*—Theodore Morris
*Attorney, Agent, or Firm*—Burgess, Ryan & Wayne

[57] ABSTRACT

The invention describes a novel material intended for use in public works, constituted by a mixture of granular, alluvial or clay soils, of hydrophilic polymers and cationic hydrophobating additives, wherein this material presents a high insensitivity to variations of ambient humidity and is intended in particular for use with building roads.

15 Claims, No Drawings

NOVEL WATER-INSENSITIVE MATERIALS INTENDED FOR PUBLIC WORKS; PROCESS AND CHEMICAL COMPOSITION FOR THEIR OBTENTION

BACKGROUND OF THE INVENTION

1. Field of the invention

The present invention concerns a novel granular material intended for use in public works, obtained through chemical processing on site or at a central station, of natural clay or alluvial soils, and relates to their method of processing as well as to the chemical compositions to be used for performing this processing operation.

Naturally available granular materials formed of sand and/or gravel do not present sufficient cohesion in the dry state when they contain substantial quantities of fines and, more specifically, of constituents the granulometry of which is comprised between 0.2 and 20 micrometers such as clays and alluvials. On the other hand, these natural binders lose their cohesion once they are soaked with water, and this therefore severely limits their conditions of use for the construction of works intended to be exposed to hydrological variations of the environment.

Usual solutions to overcome these problems have been known for many years, i.e. the use of materials free of clay or alluvial but to which have been added either organic, thermoplastic (tars, bitumens, polymers) or even thermo-hardening (synthetic resins) binders; these are morters and concretes of all kinds.

Another, less radical solution consists in using the materials, without their fines being separated, after their submission to a processing that confers to these materials an acceptable resistance to water. This is what can be considered as a stabilization.

These processing operations are based upon the reactivity of the clay based minerals with respect to various chemical compounds, the result being the constitution of modified clays the physical, chemical and geotechnical characteristics of which are specifically transformed. Processing operations which are based on aqueous solutions or powders are preferred, due to their simplicity and their economy. Among the chemical agents that can be used may be cited more particularly hydrophobating additives and hydrophilic colloids or gels.

Hydrophobating additives are essentially constituted by long hydrocarbon chain organic cations, such as fathy amines or quaternary ammonium derivatives comprising one or several chains comprising at least 12 carbon atoms. These products, such as stearylamine, or dimethyldistearylammonium chloride, used in very small quantities, modify in a spectacular manner the water-resistent quality of the clay or alluvial materials. (see for example J. M. HOOVER and D. T. DAVIDSON, Organic cationic chemical as stabilizing agent for Iowa Loess, Bul. N. 129, Highway Research Board, Chemical and mechanical stabilization).

But this action does not simultaneously lead to any real alteration on the natural cohesion of the soil, and the hydrophobated soil, after being soaked, does not have an improved bearing capacity over that of the same non-hydrophobated material.

Hydrosoluble organic polymers, among which can be cited the lignosulfites, the hydrolysed polyacrylamides, the polynaphtylmethanesulfonates, the carboxyalkylcelluloses, the natural rubbers, have been used for another of their properties, i.e. the flocculation of the natural clays. In roadmaking techniques, the improvement obtained is that of the consistency index, in fact an improved bearing capacity of the processed soil with respect to that of the natural soil, for an identical water content. These hydrophilic polymers do not, however, by themselves exert sufficient action so as to confer upon the natural materials the bearing capacity that is require to realized works exposed to severe weather conditions.

The applicants have observed that it was possible to obtain materials which were entirely suitable for their insensitivity to water and equally suitable for use in the construction of non-covered works, by applying to sands and/or clay and alluvial gravels a mixed processing operation, through hydrophilic polymer and cationic hydrophobating additives used in small quantities.

Natural soils that can be very substantially improved by such a mixed processing operation are for example, according to the classification used in the "Recommendation pour les Terrassements Routiers, Service d'Etudes Techniques des Routes et Autoroutes et Laboratoire Central des Ponts et Chaussées", January 1976, fine soils of categories $A_1$ and $A_2$ comprising slightly plastic alluvials, grits, sandy or gravelly soils with fines of category B, silty to very silty sands and gravels, clayly to very clayly sands and gravels; soils comprising fine and rough elements of category C, silex clays, millstone clays, scree, moraines, dry rocks and rough alluviums.

All these materials are classified as sensitive to water, their water-sensitivy being due to a very rapid reaction of their mechanical behaviour to the variations of their hydric and climatic environment.

One of the reagents of the invention is constituted by a substance or a mixture of substances, taken from among the group of cationic hydrophobating additives. Such products are found, in particular among:

the long chain fatty amines, having the general formula

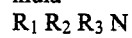

in which at least one of the R radicals is a hydrocarbonic chain, linear or branched, saturated or unsaturated, comprising from 10 to 24 carbon atoms, the other identical or different chains, when they are not chains of this type, are $C_1$ to $C_4$ short hydrocarbon radicals, or hydrogen, the preferred substances being primary monoalkylamines such as laurylamine, oleylamine, stearylamine in their pure or technical form such as coprah amine, tallow amine or hydrogenated tallow;

hydrosoluble salts of these amines, for example chlorides, acetates, formiates;

derivates of quaternary ammonium having the general formula:

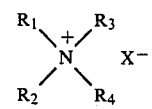

where at least one of the radicals R is a linear or branched, saturated or unsaturated hydrocarbon chain having from 10 to 24 carbon atoms;

where the other radicals R, when they are not chains of this type, are $C_1$ to $C_4$ short hydrocarbon radicals, identical or different, where $X^-$ is an anion such as $Cl^-$, $Br^-$ or $SO_4$ $CH_3^-$;

the preferred substances being dialkyldimethylammonium salts such as distearyldimethylammonium chloride in its pure form or technical form such as ditallow-dimethylammonium chloride or di(hydrogenatedtallow)dimethylammonium.

The second reactant utilized in the invention, in synergic activity with the previous one, is constituted by a hydrophilic polymer, and more specifically by a neutral or anionic macromolecule. The existence of adsorption phenomena of such structures on clays are known; this adsorption is extremely different from the quasi-irreversible adsorption of monomer or polymer cationic compounds, and most obvious result is a flocculation, i.e. a mechanical aggregation of the particules that alters the texture of the material according to modes and mechanisms described for example by A. S. Michaels, "Aggregation of suspensions by polyelectrolytes" in Ind. Eng. Chem. 1954, 46, No.7, pp-1485 or B. K. G. Heng. "Interaction of clay minerals with organic polymers, some practical applications, in Clays and Clay Minerals", 1970, No.18, pp-357.

Such products are found, especially in a non-limitative manner among:

the lignosulfonates, the acrylic polymers, polyacrylates, polymethacrylates, hydrolysed polyacrylamides . . . , polyvinylic alcohols, alkylene oxide polymers and copolymers, modified celluloses, hydroxyalkylcelluloses, carboxyalkylcelluloses . . . , polysaccharides, guar gums, alginates, xanthane, carraghenan . . .

There is a wide choice available among the hydrophilic polymers, provided that their molecular weight is comprised between 20,000 and 5,000,000, the rule being that the acceptable minimum threshold for the molecular weight is that much lower as the polymer presents a more pronounced anionic character, for example 3,000,000 for a totally non-ionic hydroxyethylcellulose, and 30,000 for a carboxymethylcellulose the substitution degree of which is 0.9.

The obtention of improved materials through a mixed processing is not yet obvious per se. If it is in fact known to render a material insensitive to water through processing with a hydrophobating additive, it may be feared that the addition of a processing with a hydrophilic agent impair this effect. U.S. Pat. No. 2,981,162 is undoubtedly a unique description of such an association, but the incompatibility between the two reactants renders it compulsory to operate the processing in two separate phases, which considerably complicates the practical use of the system on the works site.

Furthermore, the correct running of work sites requires an application of such materials, natural or chemically modified, at an optimum water content which is delimited in a fairly narrow interval. This water content at the Proctor optimum, according to the operating mode of the Laboratoire Central des Ponts et Chaussées, No. S. C.-1-1966 (Dunod); is generally close to the natural water content of soils, and in any case, somewhat lower that the water content at which these soils can be worked with some ease. It is thus totally inappropriate to furnish these soils with supplementary quantities of water by processing solutions, the operation rendering the work site inoperative until through evaporation the water content has returned to the desired value. The effect will be that much more extreme as the incorporation of the hydrophilic polymers requires diluted solutions, if it is desired to avoid other difficulties due to the distribution or the spraying of solutions that are too viscous.

The applicants have found that it was furthermore particularly simple to obtain under ordinary work site conditions, materials intended for public works that are relatively insensitive or resistant to water according to the invention, by proceeding, prior to the definitive installation, to the mixing of the clay or alluvial soils with pulverent compositions consisting in a mixture of cationic hydrophobated additives and hydrophilic polymers, such as defined herein-above, and mineral powders. These mineral powders are advantageously selected from among the powders currently utilized in public works, and especially the fines obtained by grinding soft rocks (for example, non-crystalline limestones) or hard rocks (for example, silica, basalts, . . . ). Inexpensive fillers can be constituted by those that are separated from primary pounding sands and which are often neglected due to their very high content in cay compounds.

In a preferred form of the invention, mixed powder or dust compositions are used, obtained by hot spraying in a mixer of the cationic hydrophobated additive, in the molten form or in a concentrated solution, mixing and possibly regrinding, then mixing with a desired quantity of hydrophilic polymer itself present in powder or dust form. It is however obvious that any other method of preparation of the composition can be utilized.

In the processing compositions according to the invention the cationic hydrophobasing additive and the hydrophilic polymer are present in a 10/1 and 1/10 ratio by weight, and the cationic additive polymer mixture and mineral powder are present in a 2/1 to 1/50 ratio by weight.

The useful quantities are such that the final content of the materials treated according to the invention are from 0.1 to 10 grams of each of the cationic additive and hydrophilic polymer reactants per kilogram dry soil. Preference is given to final compositions containing about 1 gram cationic hydrophobating additive per kilogram of soil, the quantity of polymer being of the same value, but it has been observed that in the case of a soils with a high clay content, generally fairly difficult to treat with a single cationic treatment, satisfactory results are obtained by preferably increasing the polymer content. Orientation tests, such as given in the examples, allow the man skilled in the art to select very simply the formulations best adapted to the specificiting of the soil to be processed.

The following non-limitative examples will render the invention more clearly apparent.

Example I to V show more precisely the advantage of the cationic additive polymer association in order to develop the resistance or insensitivity to water of the initial soil. They illustrate the useful laboratory tests and furnish indications as to the manner to carry out the best choice of the components and their quantities.

The following examples illustrate the preferred choices according to the invention insofar as they utilize dust powderous additives.

EXAMPLE I

A class $B_2$ material is reconstituted, through mixing 90% Fontainebleau sand and 10% kaolin. This material is characterized by its blue value of 0.13 (measured according to the methylene blue test, in accordance with Bulletin de Liaison des Laboratoires des Ponts et Chaussées, No. 111, January February 1981, p.5).

Furthermore, a class $A_1$ material is reconstituted, through mixing 50% Fontainebleau sand and 50% kaolin. This material is characterized by a blue value of 0.50.

The sensitivity of the sample materials and the processed materials is determined due to a thin layer capillary rise test.

In order to perform this test, a thin layer of the material is spread upon a suitable support; after thorough drying, its base is immersed and the displacement of the wetting front is measuring as a function of time.

The measure is interpreted in terms of diffusibility:

$$D = \frac{\pi}{4} \cdot \frac{Z^2}{t}$$

where Z is the height of the wetting front attained at time t.

In a more apparent manner, the processed material is characterized by comparing it with the non-processed material from which it originates by a relative diffusibility function $$D_r = \frac{D_o - D}{D_o}$$

where:
D is the diffusibility of the material according to the invention; and
$D_o$ is the diffusibility of the original material.

From observing the behaviour of the soils on the work sites and the comparison of these results with those that furnish the capillary rise test, is obtained the appreciation rule applicable to the materials according to the invention; any system which, with respect to the original soil, does not present a relative diffusibility of at least 0.90 is discarded.

The $B_2$ type material is treated with 0.1% by weight of a carboxymethylcellulose presenting a molecular weight close to 90 000 and a substitution degree of 0.7 then by 0.1% of a hydrophobating composition based on stearylamine, known as Stabiram 677, commercially distributed by the company CECA S.A.

The $A_1$ type material is treated in the same way with 0.5% by weight of the same carboxymethylcellulose, and 0.1% of Stabiram 677.

The example for which the results are given hereinabove shows, on the one hand, the advantage of the cationic additive polymer association, and on the other hand indicates how it is possible to treat a material having a high clay content with a polymer-enriched formula.

| Material | | Diffusibility (m² · s⁻¹) | $D_r$ |
|---|---|---|---|
| Material $B_2$ | Initial material | 4070 · 10⁻¹⁰ | |
| | Standard material with 0.2% Stabiram 677 | 1260 · 10⁻¹⁰ | 0.69 |
| | Standard material treated with 0.2% carboxymethylcellulose (CMC) | 945 · 10⁻¹⁰ | 0.77 |
| | | 10⁻¹⁰ | |
| | Material obtained by mixed processing of 0.1% Stabiram 677 + 0.1% CMC | 198 · 10⁻¹⁰ | 0.95 |
| Material $A_1$ | Initial material | 2790 · 10⁻¹⁰ | |
| | Material obtained by mixed processing of 0.1% Stabiram 677 + 0.5% CMC | 56 · 10⁻¹⁰ | 0.98 |

EXAMPLE II

A material according to the invention is prepared from a natural alluvium, originating from Rouen, through processing this material with 0.1% of the carboxymethylcellulose of example 1, and 0.1% of a commercially available hydrophobating additive (Stabiram 677).

The quality of the material is determined through calculating its consistency index according to the Atterberg limits (Mode Operatoire LCPCS.I. 4- Edition Dunod, or British Standard BS 1377- 1975, test 1 to 4 according to $$C = \frac{LL - W}{IP}$$

where:
C is the calculated consistency index,
LL the liquidity limit,
IP the plasticity index; and
W the overall water content expressed with respect to the dry material.

In the present example, a water content of 30% has been given. The counter-example is constituted by processed soil, according to the prior art, by the hydrophobating additive alone, Stabiram 677 in a quantity of 0.2%.

The following results are obtained

| | Natural alluvial | Simply hydrophobed alluvial | Alluvial modified by mixed treatment |
|---|---|---|---|
| LL | 37 | 37 | 48 |
| IP | 14 | 14 | 15 |
| consistancy index | 0.5 | 0.5 | 1.2 |

The material issuing from the mixed processing operation is, in the retained humidity conditions, a hard soil contrary to the original material, or to the simply hydrophobated material whose behaviour remains in this respect unchanged.

EXAMPLE III

Operating proceeds for the obtention of various materials according to the invention, by utilizing various hydrophilic polymers and various hydrophobating additives the soil, for the quantities and according to the criteria set out example I.

| hydrophilic polymer | hydrophobating additives | relative diffusibility |
|---|---|---|
| Natrosol 250 GR | Stabiram 677 | 0.962 |
| Viscogum | Stabiram 677 | 0.97 |
| Drispac Superlo | Noramium M₂SH | 0.997 |

-continued

| hydrophilic polymer | hydrophobating additives | relative diffusibility |
| --- | --- | --- |
| Cecalgum S15 | Stabiram 677 | 0.993 |
| Actigum CS11 | Stabiram 677 | 0.97 |
| Actigum CX9 | Stabiram 677 | 0.98 |
| Aubygum X23 | Noramac S | 0.993 |
| Hydrolyse Polyacrylamide N46BT | Stabiram 677 | 0.96 |
| Polyacrylate HVNA | Stabiram 677 | 0.97 |

For an improved understanding of the table of results, the composition of the cited hydrophilic polymers is specified:

Viscogum HV1007 is a guar gum (Mero-Rousselot-Satia S.A.),

Drispac Superlo is a carboxymethylcellulose (Drilling Specialities Company),

Natrosol 250 GR is a hydroxyethylcellulose (Hercules),

Cecalgum S15 is an alginate (Mero-Rousselot-SAtia S.A.),

Actigum CS11 is a seroglucane (Mero-Rousselot-Satia S.A.),

Actigum CX9 isan xanthane (Mero-Rousselot-Satia S.A),

Aubygum X23 is a carraghenan (Mero-Rousselot-Satia S.A.), the polyacrylamide N46BT is a partially hydrolysed polymer (HOECHST), the HVNA polyacrylate is in a sodic form (HOECHST), and that of the specified commercially available hydrophobating additives:

Stabiram 677 (mentioned herein-above), formulation based on stearylamine acetate, Noramium M2SH, ammonium dimethyldi(hydrogenatedtallow) chloride, Noramac S, stearylamine acetate.

EXAMPLE IV

The example displays the effect of the molecular weight of the polymer, which constituted one of the adaptation parameters of the product in the particular case of the soil to be processed.

The original material is, as explained in example 1, a class $B_2$ soil reconstituted from 90% sand from Fontainebleau and 10% kaolin; to this is added 0.1% carboxymethylcellulose and 0.1% Stabiram 677.

The carboxymethylcellulose is characterized by its average molecular weight $M_n$ and by its substitution degree S.D., i.e. the number of carboxymethyl groups per anhydroglucose group.

The efficiency of the systems is measured by the capillary rise test.

The molecular weights retained are those which confer upon the material according to the invention a relative diffusibility $D_r$ at least equal to 0.95.

They are compiled in the table set out herein-below:

| Degree of substitution D. S. | Average molecular weight (Mn) |
| --- | --- |
| 0.9 | 30 000 |
| 0.7 | 87 500 |
| 0.5 | 220 000 |
| 0.3 | 750 000 |
| 0.2 | 4 000 000 |

EXAMPLE V

The clay containing soil is processed a single operation, through mixing with a solution containing both hydrophilic polymer and the cationic hydrophobating additive. These solutions draw a certain percentage of reactants so as to maintain sufficient fluidity for their spraying. They are obtained more easily by disposing first of all the polymer in the cold or tepid water, then by adding the hydrophobating additive, preferably already in solution, and thereafter continuing stirring until homogeneity, and where necessary returning to ambient temperature.

Soil $B_2$ is the material utilized in example I.

Soil $A_1$ is constituted by 50% sand from Fontainebleau and 50% kaolin; this soil is relatively difficult to hydrophobe. Stabiram 677S, Viscogum HV 100 T, Natrosol 250 GR designate the same products as those set out in example III.

Rhodoviol 25/140 is a polyvinylic alcohol having a molecular weight close to 80 000, commercialized by Rhone-Poulenc.

| Sol | Aqueous processing solution composition | | quantity | viscosity | Relative Diffusibility |
| --- | --- | --- | --- | --- | --- |
| $A_1$ | Stabiram 677 | 100% | 0,6% | fluid | 0,56 |
| | Rhodoviol 25/140 | 5% | 12% | Semi-fluid | 0,52 |
| | Stabiram 667S | 1% | 10% | Semi-fluid | 0,90 |
| | Rhodoviol 25/140 | 5% | | | |
| $B_2$ | Stabiram 667 | 1% | 10% | Semi-fluid | 0,99 |
| | Viscogum | 1% | | | |
| | Stabiram 667 | 1% | 10% | Semi-fluid | 0,97 |
| | Polyox WSR 301 | 1% | | | |
| | Stabiram 667 | 2% | 5% | Viscous | 0,985 |
| | Natrosol 250 GR | 2% | | | |

Polyox WsR 301 is a polyoxyethylene having a molecular weight of about 4,000,000, commercialized by Union Carbide.

The efficiently of the products is determined, as previously, by the capillary rise test.

EXAMPLE VI

Spraying mixtures according to the invention were manufactured in a Lödige type mixer, according to the following operating method:

introducing the fines into the apparatus;

heating to 70°–80° C., under stirring;

introducing the cationic product in its molten state, at the same temperature;

continuing the mixing for about 30 minutes, while maintaining the temperature at 70°–80° C.;

cooling to ambient temperature, then introducing the polymer;

continuing the mixing for about a further 10 minutes.

In the following tables, setting out their efficiency, the following terms have been used according to the following acceptable meanings: for the cationic hydrophobating derivative, Noram SH designates a hydrogenated tallow amine (commercialized by the company CECA S.A.).

For the hydrophilic polymers, PAA designates an hydrolysed polyacrylamide 25% at which present a molecular weight of about $6.10^6$ (commercialized by the company HOECHST, under the denomination BEZOFLOX A31), and CMC designates a carboxymethylcellulose having a molecular weight of about 130 000 and a substitution degree of 0.7 (commercialized by the Drilling Specialities Company under the denomination Drispac Superlo).

For the fines the "silica fines" designates a 100% silica powder (commercialized by the company Sika under the denomination SIKAISOL). "Limestone fines" designates the Meudon Prolaabo White, and "porphyric fines" designates the material separated by sieving at 200 microns from a pounding sand produced from rocks of the quarries of La Meilleraie.

For the soils to be modified, "soil $B_2$" designates a soil recomposed from 90% sand from Fontainebleau and 10% kaolin, and the blue value of which is 0.1. "Soil $A_2$-alluvial" designates a natural soil having a blue value equal to 2.2 and "soil $A_2$-clay" designaes a natural soil having a blue value equal to 2.9.

The efficiency of processing and the value of the products according to the invention has been controlled by the capillary rise tests:

| Sol | Treatment product composition weight | | quantity | Diffusibility $m^2s^{-1}$ | Relative Diffusibility |
|---|---|---|---|---|---|
| $B_2$ | (sample) | | | $2200 \cdot 10^{-10}$ | |
| | Silica fines | 90% | 2% | $90 \cdot 10^{-10}$ | 0,96 |
| | Noram SH | 5% | | | |
| | PAA | 5% | | | |
| | Limestone fines | 90% | 2% | $28 \cdot 10^{-10}$ | 0,99 |
| | Noram SH | 5% | | | |
| | PAA | 5% | | | |
| | Porphyric fines | 90% | 2% | $57 \cdot 10^{-10}$ | 0,97 |
| | Noram SH | 5% | | | |
| | PAA | 5% | | | |
| $A_2$ alluvial | (sample) | | | $8860 \cdot 10^{-10}$ | |
| | Limestone fines | 70% | 2% | $0,7 \cdot 10^{-10}$ | 0,99 |
| | Noram SH | 5% | | | |
| | CMC | 25% | | | |
| $A_2$ clay | (sample) | | | $9580 \cdot 10^{-10}$ | |
| | Limestone fines | 70% | 2% | $5,3 \cdot 10^{-10}$ | 0,99 |
| | Noram SH | 5% | | | |
| | CMC | 25% | | | |

Comments:

The proportion of powderous treatment products are weight proportions expressed with respect to the dry soil.

These results confirm, apart from the surprising efficiency of the powders or dusts according to the invention, their great ease of choice for the mineral component, this choice having no prejudicial consequence upon the insensitivity to water of the processed material, and furthermore of the extreme ease in the choice of proportions of the organic components. The possibility will be noted of processing heavy soils, such as $A_2$ soils with relatively high proportions of polymer, a processing operation otherwise unavailable on the works site, either due to the too high viscosity, or even the gelling of the concentrated solutions, or to the introduction by diluted solution of inacceptable quantities of water.

EXAMPLE VII

Powderous compositions intended for processing soils according to the invention are obtained, by thoroughly mixing a carboxymethylcellulose having a molecular weight of 90 000 and a substitution degree of 0.7 with amine content fillers available on the market for other uses, especially for the antimassing of manures.

In this example, are used Fluidram KB 200 and Fluidram KB 30 which are commercialized by CECA S.A. which are powders comprising respectively 20% and 3% hydrogenated tallow amine, to prepare:

| the mixture $M_1$ | 16.7% of carboxymethylcellulose |
| --- | --- |
| | 83.3% of Fluidram KB 200 |
| the mixture $M_2$ | 3% of carboxymethylcellulose |
| | 97% of Fluidram KB 30 |

$B_2$ soil of example 1, is thoroughly mixed with one or other of these powders, and subjected, as in example I, to the capillary rise test.

The following results describe the properties of the soil treated with the quantities of reactants equal to 0.1% of polymer and 0.1% free cationic hydrophobating additive.

| | Diffusibility ($m^2 \cdot s^{-1}$) | $D_r$ |
| --- | --- | --- |
| Initial material | $4440 \cdot 10^{-10}$ | |
| Material treated with 0.6% of the mixture $M_1$ | $49 \cdot 10^{-10}$ | 0.99 |
| Material treated with 3.4% of the mixture $M_2$ | $45 \cdot 10^{-10}$ | 0.99 |

EXAMPLE VIII

A non-covered road is constructed by putting in place and mechanical compacting, according to standard methods for this type of work, of a thickness of 15 cm of a material according to the invention, constituted by a class $A_2$ soil (45% alluvial from Orly, 55% sand from Fontainebleau) and 0.1% of each of the reactants set out in example I.

After 3 months of exposing to intemperies and to local traffic estimated at 500 vehicles per day, the state of the road appeared satisfactory: this is confirmed by measuring the resistance to punching according to the method called the Proctor Needle (according to operating mode ASTM D 1558-71) which displays a value of 40 bars.

The section of the standard produced from original natural material was very worn and the resistance to punching measured on site was only 7.2 bars.

We claim:

1. A process for producing a material useful in the preparation of road surfaces which comprises mixing clay or alluvial granular materials with an additive comprised of:
   (a) at least one hydrophilic polymer selected from the group consisting of an anionic and non-ionic hydrosoluble polymer having a molecular weight of from about 20,000 to about 5,000,000; and
   (b) at least one cationic hydrophobating derivative selected from the group consisting of amines having at least one fatty chain and their salts, and quaternary ammonium salts having at least one fatty chain.

2. The process of claim 1, wherein said clay or alluvial granular materials are selected from the group consisting of clay containing soils, natural silt containing soils, recomposed clay containing soils and recomposed silt containing soils 3. The process of claim 1, wherein the hydrophilic polymer is present in an amount between 0.01% and 1% by weight of said materials and the hydrophobating agent is present in an amount between 0.01% and 1% by weight of said materials.

4. The process of claim 1, wherein said hdrophilic polymer is selected from the group consisting of: modified cellulose, hydroxycellulose, carboxycellulose, alkyl oxide polymers, alkylene oxide copolymers, polyvinyl alcohols, polysaccharides, lignosulfonates, acrylic polymers, acrylic copolymers, polyacrylates, polymethacrylates, at least partially hydrolyzed acrylamides and hydrosoluble polyaccharides.

5. The process of claim 2, wherein the hydrophilic polymer is quar gum.

6. The process of claim 2, wherein the hydrophilic polymer is scleroglucane.

7. The process of claim 1, wherein the cationic hydrophobating derivative is at least one quaternary ammonium salt selected from the group consisting of dimethyldistearylammonium, dimethylditallowammonium and dimethyldi(hydrogenated tallow) ammonium salts.

8. The process of claim 1, wherein the cationic hydrophobating derivative is at least one amine selected from the group consisting of stearylamine, tallow amine, hydrogenated tallow amine, and their salts.

9. A powdered additive for the treatment of clay and alluvial soil materials whereby said materials are rendered useful for the preparation of road surfaces, said additive comprised of:
   (a) at least one hydrophilic polymer selected from the group consisting of an anionic and non-ionic hydrosoluble polymer having a molecular weight of from about 20,000 to about 5,000,000;
   (b) at least one cationic hydrophobating derivative selected from the group consisting of amines having at least one fatty chain and their salts, and quaternary ammonium salts having at least one fatty chain; and
   (c) mineral fillers.

10. The powdered additive of claim 9 wherein the weight ratio between the amount of hydrophilic polymer and hydrophobating agent and the amount of mineral filler is comprised between 2:1 and 1:50.

11. The powdered additive of claim 9, wherein said hydrophilic polymer is selected from the group consisting of: modified cellulose, hydroxycellulose, carboxycellulose, alkylene oxide polymers, alkylene oxide copolymers, polyvinyl alcohols, polysaccharides, lignosulfonates, acrylic polymers, acrylic copolymers, polyacrylates, polymethacrylates, at least partially hydrolyzed acrylamides and hydrosoluble polysaccharides.

12. The powdered additive of claim 11, wherein the hydrophilic polymer is guar gum.

13. The powdered additive of claim 11, wherein the hydrophilic polymer is scleroglucane.

14. The powdered additive of claim 9, wherein the cationic hydrophobating derivative is at least one quaternary ammonium salt selected from the group consisting of dimethyldistearylammonium, dimethylditallowammonium and dimethyldi(hydrogenated tallow) ammonium salts.

15. The powdered additive of claim 9, wherein the cationic hydrophobating derivative is at least one amine selected from the group consisting of stearylamine, tallow amine, hydrogenated tallow amine, and their salts.

* * * * *